US008812157B2

(12) United States Patent
Morioka et al.

(10) Patent No.: US 8,812,157 B2
(45) Date of Patent: Aug. 19, 2014

(54) ROBOT SYSTEM HAVING ERROR DETECTION FUNCTION OF ROBOT AND CONTROL METHOD THEREOF

(75) Inventors: Masahiro Morioka, Yamanashi (JP); Satoshi Adachi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 187 days.

(21) Appl. No.: 13/437,178

(22) Filed: Apr. 2, 2012

(65) Prior Publication Data

US 2012/0259464 A1 Oct. 11, 2012

(30) Foreign Application Priority Data

Apr. 6, 2011 (JP) ................................. 2011-084485

(51) Int. Cl.
*G05B 19/04* (2006.01)
*B25J 9/16* (2006.01)
*G05B 19/418* (2006.01)

(52) U.S. Cl.
CPC ..................................... *B25J 9/1674* (2013.01)
USPC ................ 700/254; 700/1; 700/245; 700/248

(58) Field of Classification Search
CPC .................... B25J 9/1692; G05B 2219/45083; G05B 19/425; G05B 19/39024; B62D 57/032
USPC ................... 700/245, 248, 250, 254
See application file for complete search history.

(56) References Cited

U.S. PATENT DOCUMENTS

| | | | |
|---|---|---|---|
| 6,786,896 B1 * | 9/2004 | Madhani et al. | 606/1 |
| 7,109,678 B2 * | 9/2006 | Kraus et al. | 318/560 |
| 7,170,250 B2 * | 1/2007 | Brenner | 318/560 |
| 2004/0140787 A1 * | 7/2004 | Okamoto et al. | 318/568.21 |
| 2006/0048364 A1 * | 3/2006 | Zhang et al. | 29/407.08 |
| 2007/0227257 A1 * | 10/2007 | Harish et al. | 73/780 |
| 2007/0287992 A1 * | 12/2007 | Diolaiti et al. | 606/1 |
| 2008/0140257 A1 * | 6/2008 | Sato et al. | 700/258 |
| 2008/0188985 A1 * | 8/2008 | Sakano | 700/260 |

(Continued)

FOREIGN PATENT DOCUMENTS

| | | |
|---|---|---|
| CN | 101602208 A | 12/2009 |
| CN | 101909830 A | 12/2010 |

(Continued)

OTHER PUBLICATIONS

A JP Office Action, dated Sep. 11, 2012, issued in JP Application No. 2011-084485.

(Continued)

*Primary Examiner* — Ian Jen
(74) *Attorney, Agent, or Firm* — Lowe Hauptman & Ham, LLP

(57) ABSTRACT

When an error occurs in robot system, a difference between first and second detection values of two sensors or first and second sensors occurs due to differences in position and responsibility. When this difference exceeds a predetermined threshold, control section detects that a difference has occurred in robot system. The first and second detection values of two sensors or first and second sensors are compared, and therefore, reliability of the detection values can be secured. Further, the abnormal state can be determined through the difference between the first and second detection values, and therefore, errors resulting from problems such as variations in gears and speed reducers due to temperature changes of the operational state and disposition environment of the robot can be avoided.

8 Claims, 5 Drawing Sheets

(56) References Cited

U.S. PATENT DOCUMENTS

| | | | |
|---|---|---|---|
| 2009/0018700 A1* | 1/2009 | Okamoto et al. | 700/260 |
| 2009/0069942 A1* | 3/2009 | Takahashi | 700/260 |
| 2009/0095109 A1* | 4/2009 | Mizuno et al. | 74/490.01 |
| 2010/0109360 A1* | 5/2010 | Meisho | 294/86.4 |
| 2010/0324733 A1 | 12/2010 | Bischoff et al. | |

FOREIGN PATENT DOCUMENTS

| | | |
|---|---|---|
| JP | 4-019093 A | 1/1992 |
| JP | 2007301691 A | 11/2007 |
| JP | 2009196030 A | 9/2009 |
| JP | 2009-285775 A | 12/2009 |
| JP | 2010-284781 A | 12/2010 |

OTHER PUBLICATIONS

A JP Office Action, dated Jul. 10, 2012 in JP Application No. 2011-084485.

Office Action issued Mar. 21, 2014, corresponds to Chinese patent application No. 201210099869.7.

* cited by examiner

ROBOT SYSTEM HAVING ERROR DETECTION FUNCTION OF ROBOT AND CONTROL METHOD THEREOF

RELATED APPLICATIONS

The present application is based on, and claims priority from, Japanese Application Number 2011-084485, filed Apr. 6, 2011, the disclosure of which is hereby incorporated by reference herein in its entirety.

BACKGROUND OF THE INVENTION

1. Field of the Invention

The present invention relates to a robot system having a robot and, in particular, it relates to a robot system having error detection function of a robot.

2. Description of the Related Art

Japanese Unexamined Patent Publication No. 2009-196030 discloses a robot controller that controls operation of a robot arm with high accuracy. In this robot controller, a sensor is incorporated into a driving section of axes of a robot arm. The robot arm is driven based on a command torque value output to this robot arm. The sensor outputs an actual detected torque value that is actually transferred to the robot arm. A computation section identifies a difference between the command torque value and the detected torque value. When the identified difference is larger than or equal to a predetermined threshold, electric power supply to the robot arm is blocked.

Japanese Unexamined Patent Publication No. 2007-301691 discloses a robot controller that comprises two sensors and two computation sections incorporated for driving axes of a robot arm. In this robot controller, the two computation sections independently estimate the command torque values output to the robot arm. When the two estimated command torque values are equal to each other, differences between the two detected torque values detected by the two sensors and the two command torque values, respectively, are identified. When the identified differences are larger than or equal to a predetermined threshold, electric power supply to the robot arm is blocked.

In the techniques disclosed in Japanese Unexamined Patent Publications No. 2009-196030 and No. 2007-301691, frictional forces in components of the robot arm such as gears and speed reducers fluctuate due to temperature changes in an operational state and disposition environment of the robot arm. The fluctuations of the frictional forces affect the robot controllers described above. For example, the larger the frictional forces are, the larger the difference between the command torque value and the detected torque value is. As a result, in order to prevent false detection, a threshold with a margin has to be set. Even when the robot arm collides with a human or an object, for example, the collision, therefore, cannot be detected with high accuracy.

The present invention has been made to solve the above problems, and it is an object of the present invention to provide a robot system that can detect error occurring in the robot system with high sensitivity and a control method thereof.

SUMMARY OF THE INVENTION

In order to solve the above problem, according to the present invention, a robot system is provided comprising:

a robot;

first and second sensors that output predetermined first and second detection values, respectively, based on a force acting on the robot; and a control section that identifies a difference between the first detection value output from the first sensor and the second detection value output from the second sensor and, when the difference exceeds a predetermined threshold, determines that an error occurs in the robot.

In this robot system, the control section determines that a force larger than or equal to a predetermined force acts on the robot when the difference exceeds the threshold and at least any one of the first and second detection values of the first and second sensors exceeds a predetermined permissible value.

In this robot system, the control section determines that an error occurs in at least any one of the first and second sensors when the difference exceeds the threshold and neither of the first and second detection values of the first and second sensors exceeds a predetermined permissible value.

In this robot system, responsibility of the first sensor differs from that of the second sensor.

Further, according to the present invention, there is provided a control method of a robot system comprising the steps of:

identifying a difference between first and second detection values output from first and second sensors, respectively, based on a force acting on a robot; and determining that an error occurs in the robot when the difference exceeds a predetermined threshold.

This control method of the robot system further comprises the step of determining that a force larger than or equal to a predetermined force acts on the robot when the difference exceeds the threshold and at least any one of the first and second detection values of the first and second sensors exceeds a predetermined permissible value.

This control method of the robot system further comprises the step of determining that an error occurs in at least any one of the first and second sensors when the difference exceeds the threshold and neither of the first and second detection values of the first and second sensors exceeds a predetermined permissible value.

In this control method of the robot system, responsibility of the first sensor differs from that of the second sensor.

These and other objects, features and advantages of the present invention will be more apparent in light of the detailed description of exemplary embodiments thereof as illustrated by the drawings.

DETAILED DESCRIPTION

Figure 1:
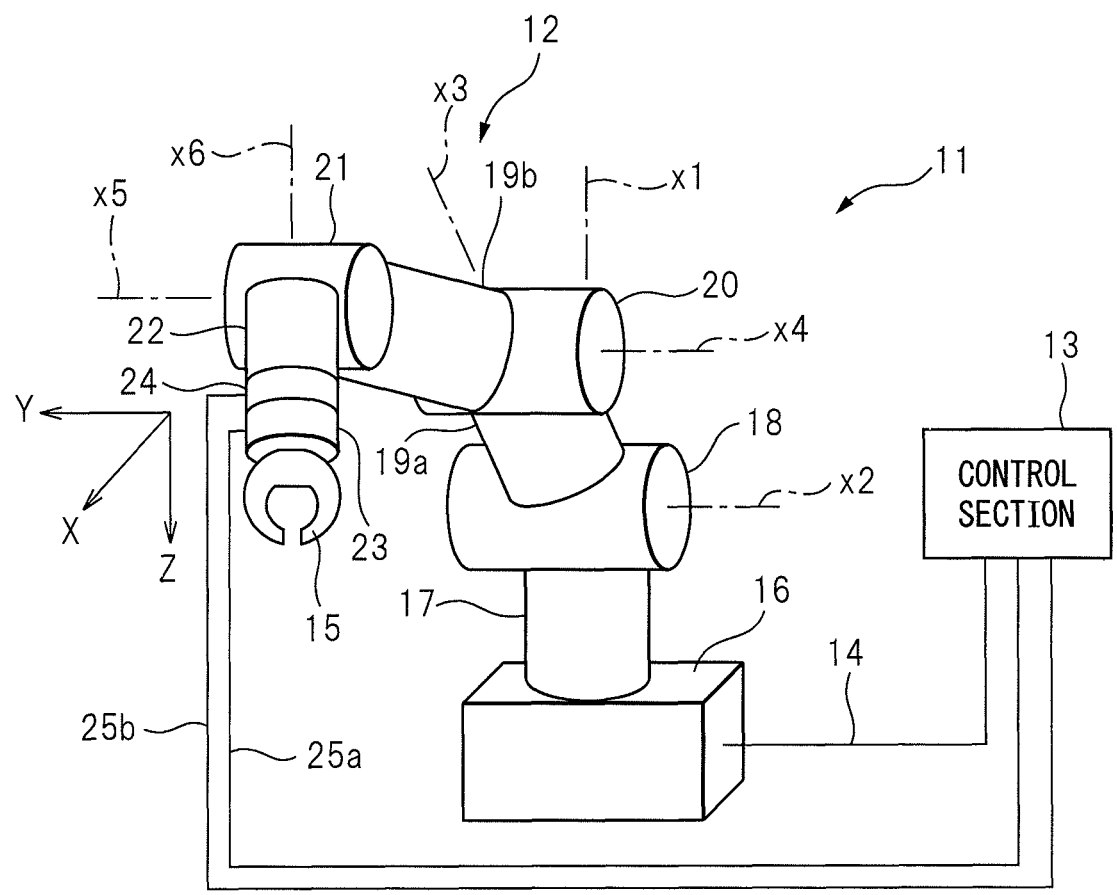
FIG. 1 is a diagram schematically illustrating a structure of a robot system according to a first embodiment of the present invention.

Hereinafter, an embodiment of the present invention will be described with reference to the accompanying drawings. FIG. 1 is a diagram schematically illustrating a structure of a robot system 11 according to a first embodiment of the present invention. This robot system 11 comprises: an articulated robot 12 that constitutes, for example, a six-axis vertical articulated robot; and a control section 13 that is connected to articulated robot 12 to control operation of articulated robot 12. Articulated robot 12 and control section 13 are connected by a wiring 14. Articulated robot 12 comprises a working tool or a robot hand 15. Robot hand 15 can grasp, for example, a workpiece. This articulated robot 12 is disposed in a space where, for example, articulated robots 12 and people work together.

Articulated robot 12 comprises: a base stand 16 that is stably fixed, for example, to a floor surface; a proximal end arm 17 that is coupled to base stand 16 rotatably, for example, about a rotational axis line x1 that is orthogonal to the floor surface; a first wrist element 18 that is coupled to proximal end arm 17 rotatably about a rotational axis line x2 that is orthogonal to the rotational axis line x1; a first intermediate arm 19a that is coupled to first wrist element 18 rotatably about a rotational axis line x3 that is orthogonal to the rotational axis line x2; a second wrist element 20 that is coupled to first intermediate arm 19a rotatably about a rotational axis line x4 that is orthogonal to the rotational axis line x3; a second intermediate arm 19b that is coupled to second wrist element 20; a third wrist element 21 that is coupled to second intermediate arm 19b rotatably about a rotational axis line x5 that is orthogonal to the rotational axis line x4; and a distal end arm 22 that is coupled to third wrist element 21 rotatably about a rotational axis line x6 that is orthogonal to the rotational axis line x5.

Robot hand 15 described above is, for example, removably mounted to a tip of distal end arm 22. In order to implement rotations about the rotational axis lines x1-x6, servo motors (not illustrated) are incorporated in articulated robot 12. Each servo motor has an encoder that detects an rotational angle of such servo motor. The servo motors rotate at predetermined rotational angles based on driving signals output from control section 13. The rotations of the servo motors allow articulated robot 12 to move about rotational axis lines x1-x6. Angular signals that indicate the rotational angles of the servo motors are fed back from the encoders to control section 13. Thus, articulated robot 12 can change its posture to a predetermined position at a predetermined speed.

In the first embodiment, two sensors or first and second sensors 23 and 24 are disposed adjacent to each other between distal end arm 22 and robot hand 15 in the direction of the rotational axis line x6. First sensor 23 is disposed at a position nearer to robot hand 15 than second sensor 24. Second sensor 24 is attached to a tip of distal end arm 22. Robot hand 15 is attached to first sensor 23 that is, in turn, attached to second sensor 24. As first and second sensors 23 and 24, distortion gauges, for example, or force sensors that detect mechanical distortion through change of light reflection, capacitance between objects and so on are used. First and second sensors 23 and 24 can detect a force acting on robot hand 15 and a force acting on the workpiece grasped by robot hand 15. Detected values are output from first and second sensors 23 and 24 to control section 13. The detected values are gravity corrected with respect to robot hand 15 and the workpiece grasped by robot hand 15.

A three-axis orthogonal reference coordinate system is set to each of first and second sensors 23 and 24 of robot system 11. The Z axis is defined in parallel to the rotational axis line x6 and orthogonal to the X and Y axes. First and second sensors 23 and 24 described above can detect force components in the X, Y and Z directions (Fx, Fy, Fz) acting on first and second sensors 23 and 24 themselves and moment components about the X, Y and Z axes (Mx, My, Mz) of first and second sensors 23 and 24 themselves. The thus detected values of the force components and the moment components are output to control section 13. In order to output the values, wirings 25a and 25b between first and second sensors 23 and 24 and control section 13, respectively, are used. During the operation of articulated robot 12, first and second sensors 23 and 24 continuously output first and second detection values to control section 13, respectively.

Control section 13 is connected to a storage device (not illustrated) that stores the first detection value output from first sensor 23, the second detection value output from second sensor 24 and an error detection software program for detecting error in robot system 11. Based on the error detection software program stored in the storage device, control section 13 can perform various computations. The error detection software program may be temporarily read out onto a memory (not illustrated) at the time of computation. Alternatively, the error detection software program may be captured to the storage device from a portable storage medium such as, for example, a FD (flexible disk), a CD-ROM and the like or it may be captured to the storage device from a computer network such as a LAN or the Internet.

Before starting the operation of robot system 11, various conditions are set in advance in robot system 11. First, a normal operation of articulated robot 12 is tested. In the normal operation, articulated robot 12 repeats a predetermined movement with respect to the workpiece. At this time, the detection values of first and second sensors 23 and 24 are output to control section 13. Even if there is no error, variations in the detection values occur in first and second sensors 23 and 24 due to individual difference between the sensors and the like. Here, control section 13 uses, for example, a resultant force calculated from the force components (Fx, Fy, Fz) to identify the difference.

In robot system 11, during the normal operation of the articulated robot 12, the first and second detection values vary according to the operation of articulated robot 12. Based on the first and second detection values, control section 13 identifies the difference between the first and second detection values. Based on the identified difference, a predetermined threshold that is, for example, larger than the maximum value of the difference identified at the normal operation of articulated robot 12 is set. The threshold is identified in advance in consideration of a margin to avoid false detection. When an error occurs in robot system 11, a large difference that exceeds the predetermined threshold occurs between the first and second detection values due to the difference of the installation positions and responsibilities between first and second sensors 23 and 24. When the difference between the first and second detection values exceeds this threshold, control section 13 can therefore determine that the error occurs in robot system 11, as described below. This threshold is stored in the storage device. The error of robot system 11 occurs when a force larger than or equal to the predetermined value acts on articulated robot 12 or, in other words, for example, when a foreign object collides with articulated robot 12 or when an error occurs in at least any one of first and second sensors 23 and 24, and so on.

At the same time, control section 13 identifies the maximum value of the first and second detection values during the normal operation of articulated robot 12. A value larger than the identified maximum value is set as a predetermined permissible value described below. The magnitude of the margin between the identified maximum value and the permissible value may be determined in consideration of, for example, a value detected as a result of collision with the people entering the space where robot system 11 resides. In view of the above, when at least any one of the first and second detection values exceeds this permissible value, control section 13 determines that articulated robot 12 collides with the foreign object, as described below. This permissible value is stored in the storage device. The foreign object includes the people, peripheral devices disposed in robot system 11.

Figure 2:
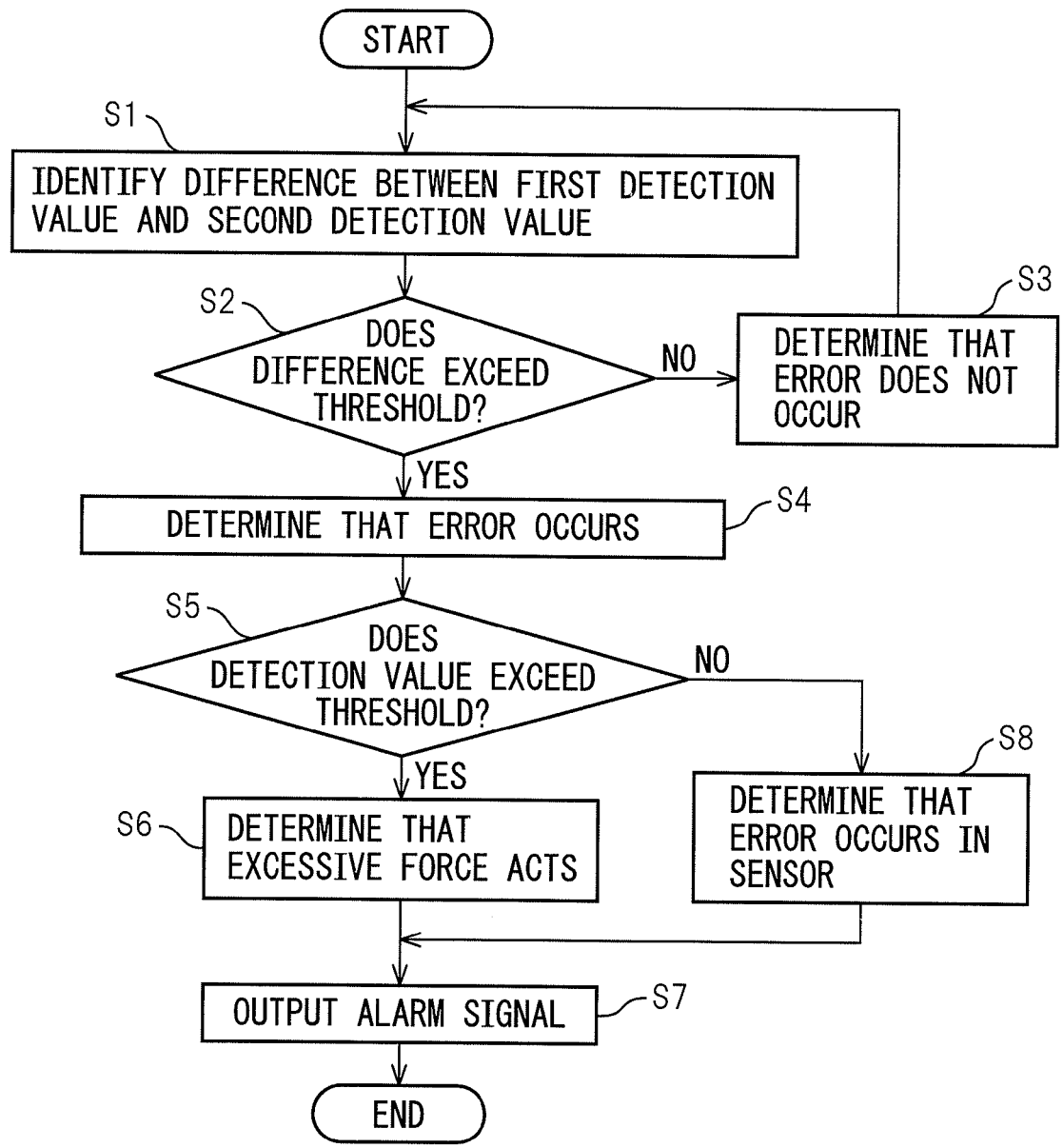
FIG. 2 is a flowchart illustrating an operational flow of a control method of a robot system according to the present invention.

FIG. 2 is a flowchart illustrating an operational flow of control section 13 of robot system 11 according to the present invention. Control section 13 performs computation based on the error detection software program. When robot system 11 starts first and second sensors 23 and 24 output the first and second detection values, respectively, according to the operation of articulated robot 12. In step S1, control section 13 identifies the difference between the output first and second detection values. In step S2, control section 13 monitors whether the difference between the first and second detection values exceeds or is larger than the predetermined threshold described above or not. When the difference does not exceed the predetermined threshold described above (step S2, NO), control section 13 determines that the error does not occur in robot system 11 in step S3. The process returns to step S1. Thus, control section 13 repeats the process of steps S1-S3.

Figure 3:
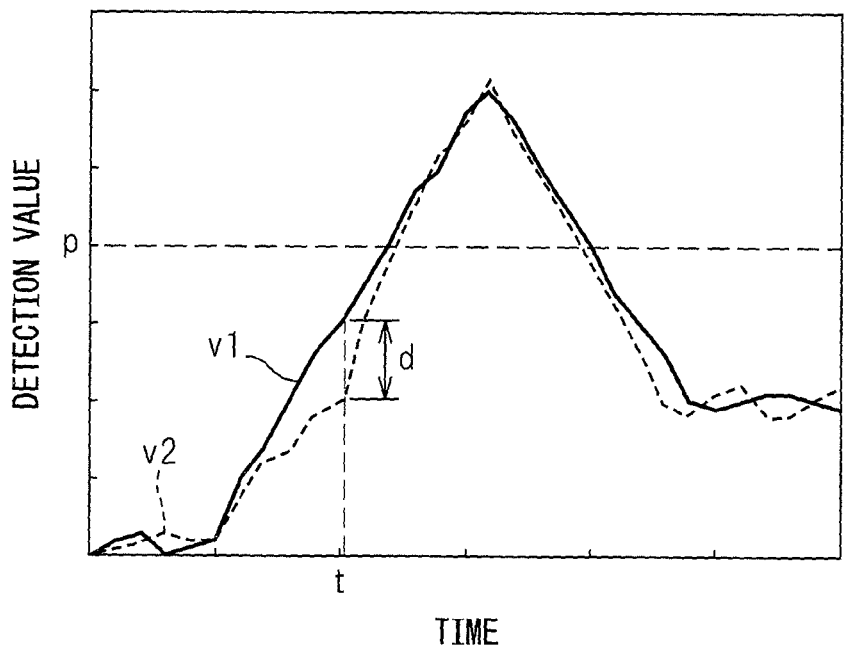
FIG. 3 is a graph illustrating variations of first and second detection values according to a specific example.

FIG. 3 is a graph illustrating variations of the first and second detection values according to a specific example. In this graph, the vertical axis represents the detection value and the horizontal axis represents the time. The permissible value p described above is set on the vertical axis. First detection value v1 is indicated by a solid curve and second detection value v2 is indicated by a dotted curve. First and second detection values v1 and v2 vary with the lapse of time. Control section 13 detects that the difference d between first and second detection values v1 and v2 exceeds the threshold at a time t (step S2, YES). As a result, in step S4, control section 13 determines that any error occurs in robot system 11. Detecting the occurrence of the error, in step S5, control section 13 monitors whether at least any one of first and second detection values v1 and v2 exceeds the permissible value p or not for a predetermined time period.

As apparent from FIG. 3, both first and second detection values v1 and v2 exceed the permissible value p (step S5, YES) and, therefore, the process of control section 13 proceeds to step S6. In step S6, control section 13 determines that an excessive impact force acts on robot hand 15 due to collision. As a result, in step S7, control section 13 outputs an alarm signal indicating that the error occurs in robot system 11. Based on the output of the alarm signal, robot system 11 gives a warning by an alarm displayed on a monitor (not illustrated), a sound alarm, for example, by an alarm device (not illustrated), a lighting of an alarm lamp (not illustrated) and so on. Due to the warning described above, for example, an administrator of robot system 11 and other robot systems around robot system 11 can be informed of the occurrence of the error in robot system 11. As a result, the neighboring robot systems can also perform the operation in response to the error.

Further, in place of or in addition to the warning described above, based on the output of the alarm signal, articulated robot 12 may perform an operation for securing safety. For example, articulated robot 12 may stop its operation. In this case, for example, articulated robot 12 may stop its operation in response to the establishment of a state similar to a detection state of a light curtain (not illustrated). Alternatively, articulated robot 12 may perform an operation so that robot hand 15 moves in a direction in which first and second detection values v1 and v2 are reduced. The direction in which first and second detection values v1 and v2 are reduced is identified as the direction in which the force components in the detection values are reversed. This movement allows robot hand 15 to be separated from the colliding foreign object. Further, in response to the output of the alarm signal, articulated robot 12 may perform a predetermined safety operation.

Figure 4:
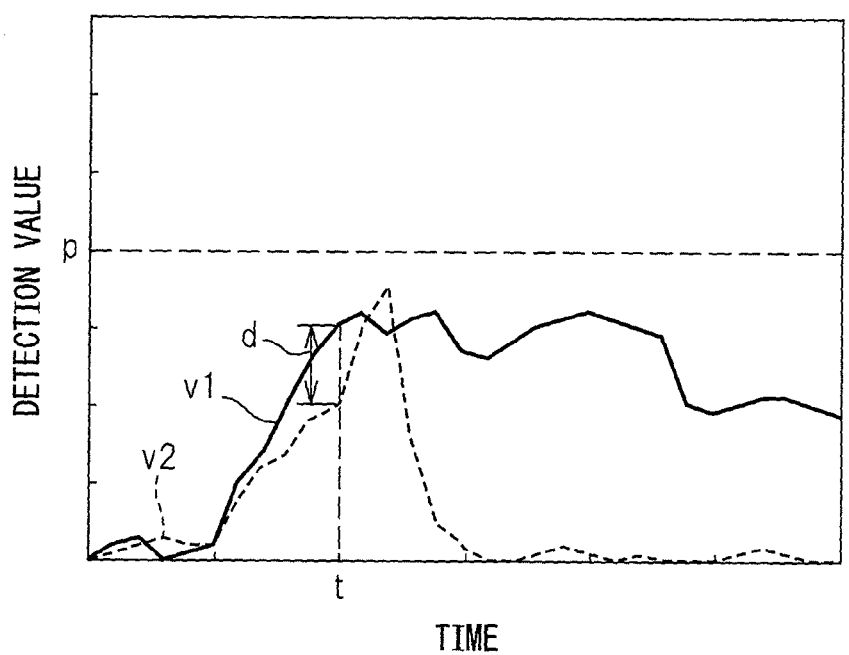
FIG. 4 is a graph illustrating variations of first and second detection values according to another specific example.

FIG. 4 is a graph illustrating variations of the first and second detection values according to another specific example. Similarly to FIG. 3, the vertical axis represents the detection value and the horizontal axis represents the time. The permissible value p described above is set on the vertical axis, similarly to the previous example. First detection value v1 is indicated by a solid curve and second detection value v2 is indicated by a dotted curve. Similarly to the example described above, control section 13 detects that the difference d between first and second detection values v1 and v2 exceeds the threshold at a time t (step S2, YES). As a result, in step S4, control section 13 determines that any error occurs in robot system 11. Detecting the occurrence of the error, in step S5, control section 13 monitors whether at least any one of first and second detection values v1 and v2 exceeds the permissible value p or not for a predetermined time period. As apparent from FIG. 4, neither of first and second detection values v1 and v2 exceeds the permissible value p (step S5, NO) and, therefore, robot hand 15 does not collide with anything. As a result, the process of control section 13 proceeds to step S8.

In step S8, control section 13 determines that the error occurs in at least any one of first and second sensors 23 and 24. In this case, the process of control section 13 proceeds to step S7 described above. Here, as apparent from FIG. 4, in comparison with first detection value v1, second detection value v2 is hardly detected and, therefore, for example, it is presumed that the error occurs in second sensor 24. Similarly to the example described above, in step S7, control section 13 outputs an alarm signal indicating that the error occurs in robot system 11. Based on the output of the alarm signal, robot system 11 performs the operation similar to that described above. The error of first and second sensors 23 and 24 includes, for example, a hardware fault and a software malfunction of first and second sensors 23 and 24 themselves, a malfunction of wirings 25a and 25b, a hardware malfunction of control section 13, and the like.

In robot system 11 described above, there occurs a difference between the first and second detection values due to the difference of the positions between two sensors or first and second sensors 23 and 24. When this difference exceeds a predetermined threshold, control section 13 detects that any error occurs in robot system 11. Thus, the first and second detection values of two sensors or first and second sensors 23 and 24 are relatively compared and, therefore, reliability of the detection values can be secured. Further, the abnormal state can be determined through the difference between the first and second detection values and, therefore, errors resulting from uncertain elements such as variations of gears and speed reducers due to temperature changes of the operational state and disposition environment of the robot can be avoided. Because such errors do not have to be taken into consideration, the threshold of the difference between the detection values can be set smaller. As a result, robot system 11 can detect the error occurring in robot system 11 with high sensitivity.

Moreover, when at least any one of the first and second detection values of first and second sensors 23 and 24 exceeds a predetermined permissible value, control section 13 can detect that robot hand 15 collides with anything. Thus, the collision of robot hand 15 can be detected with high sensitivity. On the contrary, when at least any one of the first and second detection values of first and second sensors 23 and 24 does not exceed the predetermined permissible value, control section 13 can detect that the collision does not occur but at least any one of first and second sensors 23 and 24 has a malfunction. Thus, the malfunction of first and second sensors 23 and 24 can be detected with high sensitivity and, therefore, the reliability of the detection values of first and second sensors can be secured.

Further, in robot system 11, first and second sensors 23 and 24 are disposed adjacent to each other, for example, in the direction of the rotational axis line x6. In the example illustrated in FIG. 1, first sensor 23 and second sensor 24 are disposed to make direct contact with each other. In other words, other components are not inserted between first sensor 23 and second sensor 24. On the contrary, when components are inserted between first sensor 23 and second sensor 24, uncertain elements such as an excessive difference occur between the first detection value and the second detection value due to rigidity of the components. The present invention can eliminate such uncertain elements. In other words, the detection values do not have to be corrected for the excessive difference. The present invention can, therefore, prevent degradation of accuracy of detection of the collision and the malfunction of first and second sensors 23 and 24.

Further, in robot system 11 as described above, when the difference between the first and second detection values is identified, the force components (Fx, Fy, Fz) or the moment components (Mx, My, Mz), for example, output from first and second sensors 23 and 24 may be compared. Further, when the resultant force is identified, for example, the force components in the two directions may be combined. Further, the resultant force may be obtained not from the force components but from Mx and My and points of application of the forces.

Figure 5:
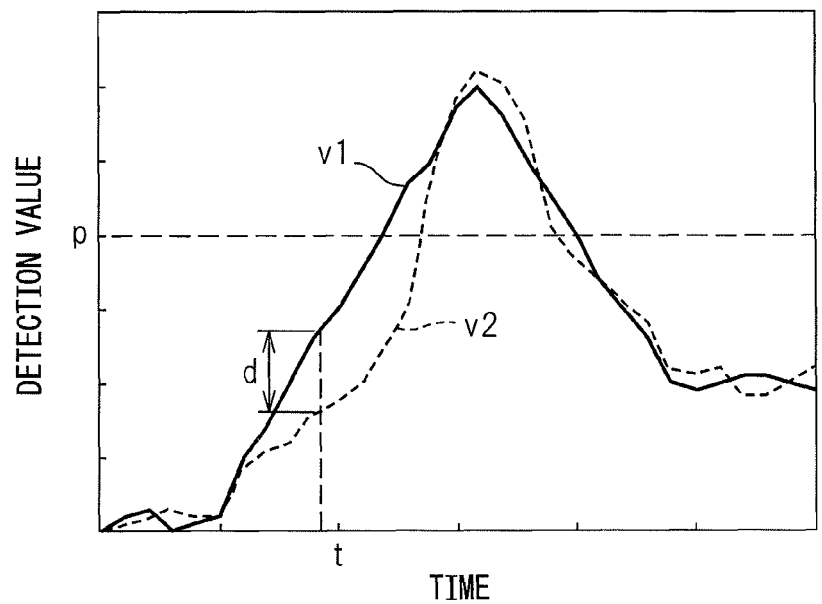
FIG. 5 is a graph illustrating variations of first and second detection values according to yet another specific example.

FIG. 5 is a graph illustrating variations of the first and second detection values according to another specific example. This graph is similar to the graph of FIG. 3. But, in this example, first sensor 23 and second sensor 24 that have characteristics different from each other are used. For example, second sensor 24 that is farther from robot hand 15 has a responsibility slower than first sensor 23. As a result, as apparent from FIG. 5, due to the fact that the detection of second detection value v2 is more delayed than that of first detection value v1 and so on, the difference between first detection value v1 and second detection value v2 upon the occurrence of the error increases more abruptly than in the case of FIG. 3. Control section 13 can, therefore, detect that the difference exceeds the threshold more rapidly and with higher accuracy than in the case of FIG. 3. In addition, this robot system 11 can implement the effects similar to those described above.

Figure 6:
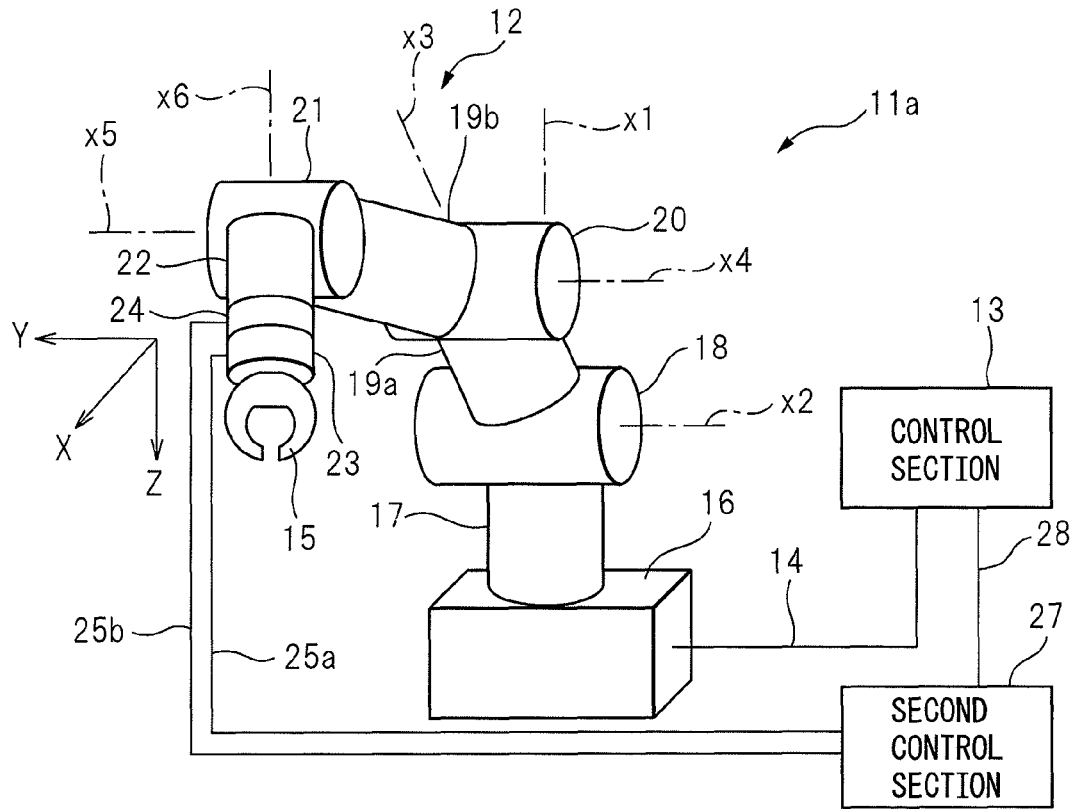
FIG. 6 is a diagram schematically illustrating a structure of a robot system according to a second embodiment of the present invention.

FIG. 6 is a diagram schematically illustrating a structure of a robot system 11a according to a second embodiment of the present invention. In this figure, elements having construction or structure identical to those described above are designated by the same reference numerals. In this robot system 11a, first and second sensors 23 and 24 are connected to a second control section 27. The first and second detection values are output to second control section 27. Second control section 27 is connected to control section 13 described above via a wiring 28. Second control section 27 executes the error detection software as described above. However, control section 13 controls the operation of articulated robot 12 based on, for example, an alarm signal output from second control section 27. The process to detect the error and the process to control the operation of articulated robot 12 is performed by the separate control sections and, therefore, processing speed in robot system 11 can be increased.

Figure 7:
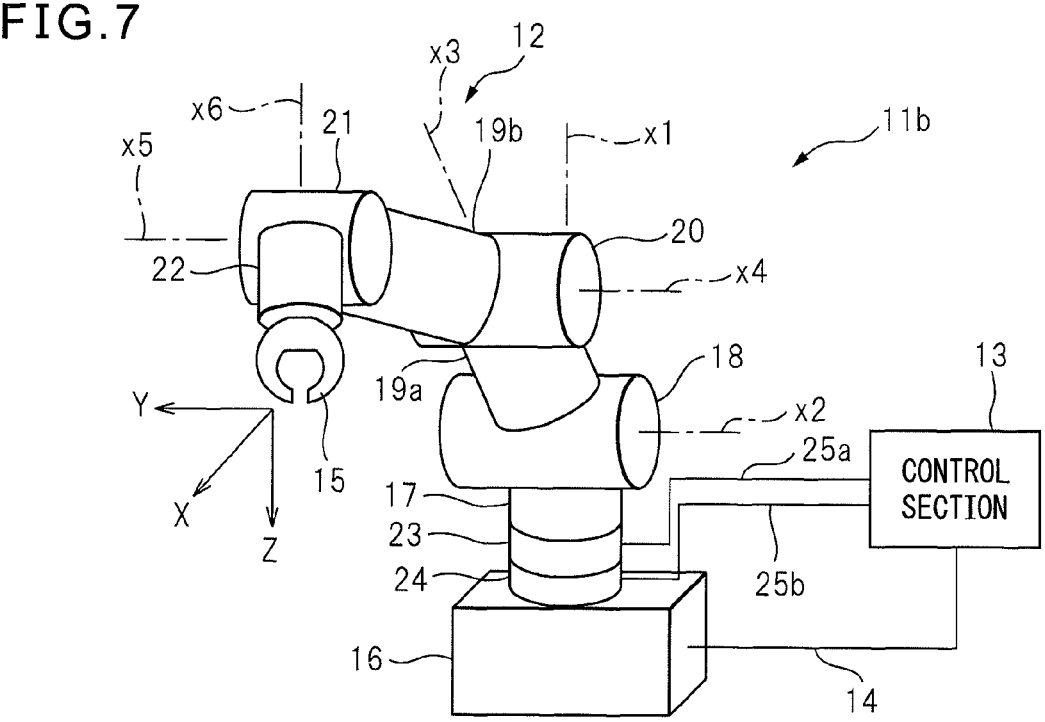
FIG. 7 is a diagram schematically illustrating a structure of a robot system according to a third embodiment of the present invention.

FIG. 7 is a diagram schematically illustrating a structure of a robot system 11b according to a third embodiment of the present invention. In this figure, elements having construction or structure identical to those described above are designated by the same reference numerals. In this robot system 11b, first and second sensors 23 and 24 adjacent to each other are disposed between base stand 16 and proximal end arm 17. First sensor 23 is attached to, for example, proximal end arm 17. Second sensor 24 is attached to, for example, base stand 16. These first and second sensors 23 and 24 can detect the forces acting on articulated robot 12 between proximal end arm 17 and robot hand 15. Collision with most of articulated robot 12 can, therefore, be detected with high accuracy. In addition, this robot system 11b can implement the effects similar to those described above.

Figure 8:
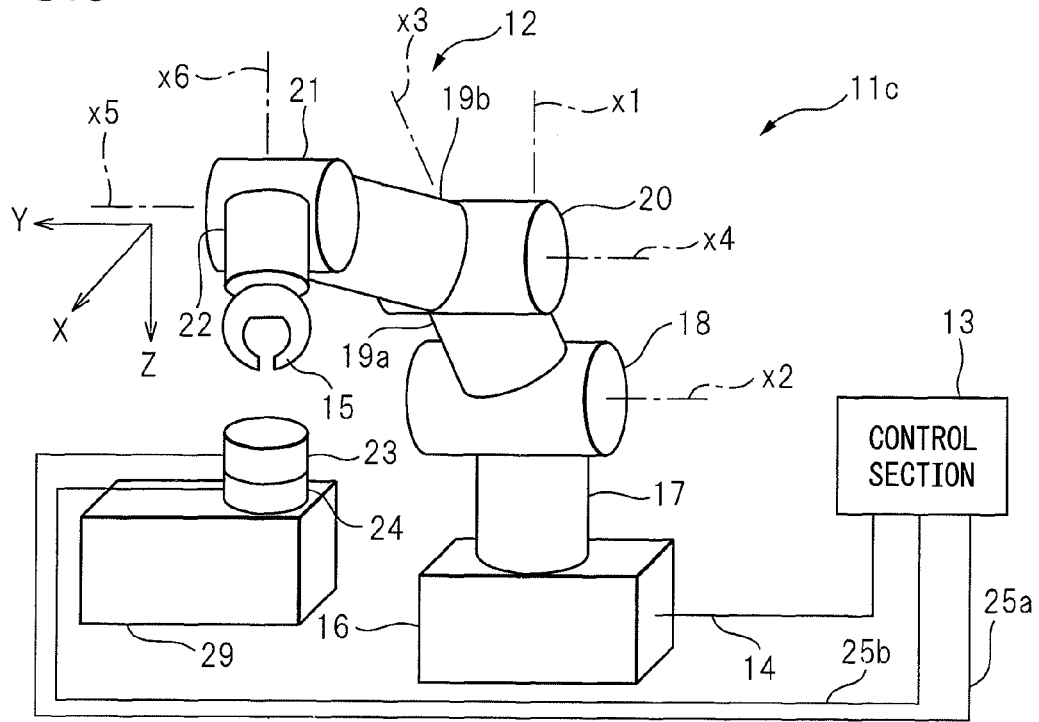
FIG. 8 is a diagram schematically illustrating a structure of a robot system according to a fourth embodiment of the present invention.

FIG. 8 is a diagram schematically illustrating a structure of a robot system 11c according to a fourth embodiment of the present invention. In this figure, elements having construction or structure identical to those described above are designated by the same reference numerals. This robot system 11c comprises a peripheral device 29 disposed about articulated robot 12. As peripheral device 29, for example, a table is used. First and second sensors 23 and 24 are attached to peripheral device 29. Robot hand 15 of articulated robot 12 performs an operation, for example, for mounting a connector on a substrate (both not illustrated) disposed on first sensor 23. When this connector is mounted, robot hand 15 exerts a force on the substrate or first and second sensors 23 and 24 via the connector. At this time, based on the detection of the force from the substrate, first and second sensors 23 and 24 output the first and second detection values, respectively.

In robot system 11c described above, during the test of the normal operation of articulated robot 12, the threshold and the permissible value are set, similarly to the embodiments described above. For example, in response to collision of a foreign object with articulated robot 12, robot hand 15 may accidentally collide with the substrate via the connector. At this time, based on the force acting from articulated robot 12 on peripheral device 29, first and second sensors 23 and 24 output predetermined first and second detection values, respectively. Thus, based on the predetermined threshold and permissible value, the process similar to that described above is performed. As a result, control section 13 can detect the collision of articulated robot 12 with high sensitivity. Further, similar to the embodiments described above, the malfunction of first and second sensors 23 and 24 can be detected with high sensitivity.

Further, first and second sensors 23 and 24 may be disposed in robot hand 15. Still further, in robot systems 11-11c, first sensor 23 and second sensor 24 may be disposed so that they are separated from each other. In this case, as described above, an excessive difference between the first detection value and the second detection value that occurs due to the rigidity of the components inserted between first sensor 23 and second sensor 24 is measured in advance. This excessive difference is corrected by a predetermined coefficient for correcting the difference of the disposition of first and second sensors 23 and 24. A calculated value obtained by multiplying the detection value by the coefficient is used as the detection value after the correction. This coefficient can be determined from the first and second detection values of first and second sensors 23 and 24, for example, during the test of the normal operation.

Further, in the embodiments described above, in addition to, for example, robot hand 15 for handling the workpiece, other working tools selected according to the process to be performed such as, for example, arc welding, spot welding, assembly, inspection, sealing, laser, waterjet and the like may be used.

EFFECT OF INVENTION

According to the present invention, it is possible to provide a robot system that can detect an error occurring in a robot with high sensitivity and a control method thereof.

While the present invention has been described with reference to the typical embodiments, those skilled in the art can understand that the changes described above and other various changes, omissions or additions can be made without departing from the scope of the present invention.

What is claimed is:

1. A robot system, characterized in that it comprises:
   a robot;
   first and second sensors that output predetermined first and second detection values, respectively, based on a force acting on said robot; and
   a control section that identifies a difference between the first detection value output from said first sensor and the second detection value output from said second sensor and, when said difference exceeds a predetermined threshold, determines that an error occurs in said robot.

2. A robot system according to claim 1, characterized in that said control section determines that a force larger than or equal to a predetermined force acts on said robot when said difference exceeds said threshold and at least any one of said first and second detection values of said first and second sensors exceeds a predetermined permissible value.

3. A robot system according to claim 1, characterized in that said control section determines that an error occurs in at least any one of said first and second sensors when said difference exceeds said threshold and neither of said first and second detection values of said first and second sensors exceeds a predetermined permissible value.

4. A robot system according to claim 1, characterized in that responsibility of said first sensor differs from that of said second sensor.

5. A control method of a robot system, characterized in that it comprises the steps of:
   identifying a difference between first and second detection values output from first and second sensors, respectively, based on a force acting on a robot; and
   determining that an error occurs in said robot when said difference exceeds a predetermined threshold.

6. A control method of a robot system according to claim 5, characterized in that it further comprises the step of determining that a force larger than or equal to a predetermined force acts on said robot when said difference exceeds said threshold and at least any one of said first and second detection values of said first and second sensors exceeds a predetermined permissible value.

7. A control method of a robot system according to claim 5, characterized in that it further comprises the step of determining that an error occurs in at least any one of said first and second sensors when said difference exceeds said threshold and neither of said first and second detection values of said first and second sensors exceeds a predetermined permissible value.

8. A control method of a robot system according to claim 5, characterized in that responsibility of said first sensor differs from that of said second sensor.

* * * * *